United States Patent [19]
Kulak et al.

[11] Patent Number: 5,413,456
[45] Date of Patent: May 9, 1995

[54] AIRCRAFT FAN CONTAINMENT STRUCTURE

[75] Inventors: Andrew C. Kulak, Hartford; Kurt M. Dembeck, Vernon; Richard T. White, West Hartford, all of Conn.

[73] Assignee: United Technologies Corporation, Hartford, Conn.

[21] Appl. No.: 236,281

[22] Filed: Apr. 29, 1994

[51] Int. Cl.[6] .............................................. F01D 21/00
[52] U.S. Cl. .................................... 415/9; 415/200
[58] Field of Search ................. 415/9, 173.1, 173.4, 415/174.4, 196, 197, 200

[56] References Cited

U.S. PATENT DOCUMENTS

| | | |
|---|---|---|
| 4,417,848 | 11/1983 | Dembeck ........................... 415/200 |
| 4,490,092 | 12/1984 | Premont . | |
| 4,648,795 | 3/1987 | Lardellier ............................ 415/9 |

Primary Examiner—Edward K. Look
Assistant Examiner—Christopher Verdier
Attorney, Agent, or Firm—Edward L. Kochey, Jr.

[57] ABSTRACT

Isogrid structure (20) forms case (14) surrounding the fan blades. In the zones where blade penetration is anticipated, the ribs (38) of the lattice do not run circumferentially. The skin segments (48) are of different thickness in different zones, but do not differ more than 30% from the thickness of an adjoining segment.

9 Claims, 2 Drawing Sheets

AIRCRAFT FAN CONTAINMENT STRUCTURE

TECHNICAL FIELD

The invention relates to turbofan engines and in particular to a structure for containing fractured fan blades.

BACKGROUND OF THE INVENTION

Turbofan aircraft engines have large fans at the forward end. They rotate at a high speed at about 3000 revolutions per minute.

Foreign objects such as birds, hailstones or debris ingested from the ground occasionally strike the fan blades. It is possible for this to cause the fan blades to fragment. These fragments may be on the order of 7 kilograms traveling at about 930 meters per second. It is essential to contain the blade fragments and also to retain the casing.

A typical containment structure is shown in U.S. Pat. No. 4,490,092 entitled "Comment Structure" and issued to Emile J. Premont. A support structure has "c" shaped stiffeners between inner and outer sheets. This structure surrounds the fan and has multiple layers of woven KEVLAR ® ballistic fabric (trademark of DuPont Corporation). This fabric is wound under tension and serves to resiliently contain blade fragments passing through the support structure.

It is critical to contain fragmented blades without disintegration or collapse of the casing against the blade. It is important that the containment structure be lightweight.

Isogrid structures are known and used in space vehicles and aircraft because of the high stiffness with low weight. The structures consist of a triangulation of stiffening members with or without a skin on one side. Isogrid structures had been used generally as a portion of containment structures for turbofans.

SUMMARY OF THE INVENTION

A cylindrical case surrounds the fan blades of the turbofan of an aircraft engine. This case has a forward containment zone upstream of the blades and an inplane containment zone substantially in the plane of the blades. An aft containment zone is located downstream of the inplane containment zone with a rear support zone located still further downstream. The casing is supported downstream of the rear support zone.

A multiple layer winding of a woven ballistic fabric such as KEVLAR fabric surrounds the casing.

The casing is formed with an isogrid pattern having a lattice of flanged ribs in isometric triangular relationship. The flange is on the radially outside edge. The ribs run parallel to the axis and at 60° from the axis of the case.

An integral skin is located on the radially inside edge of the lattice whereby triangular skin segments are formed between the ribs. The skin segments have a maximum thickness in the inplane containment zone and a lesser thickness in both the forward containment zone and the aft containment zone.

The thickness of the skin in adjacent skin segments do not differ more than 30%. The rear support zone has skin of lesser thickness, but still not differing more than 50% from the adjacent skin.

DESCRIPTION OF THE PREFERRED EMBODIMENT

Figure 1:
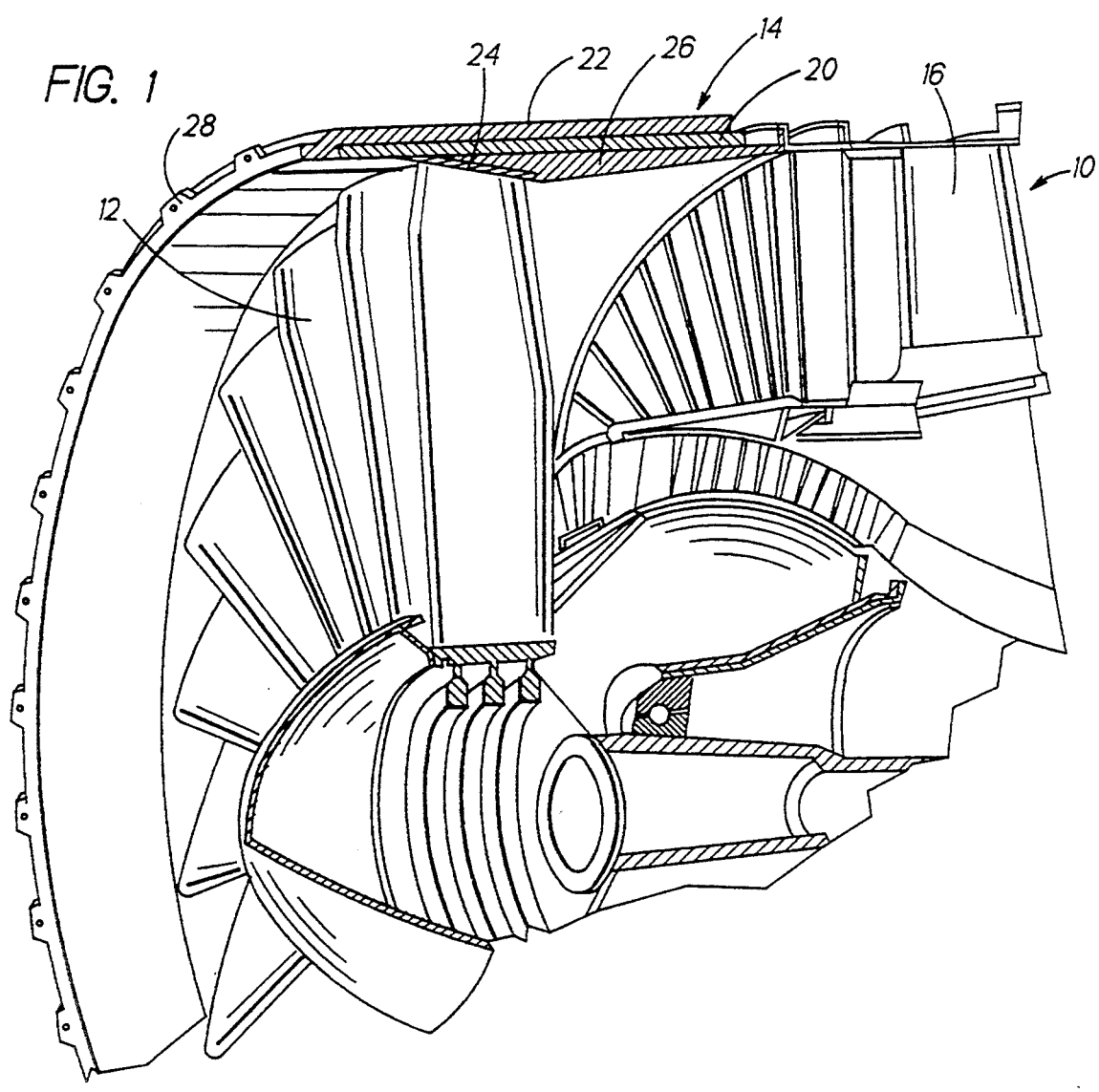
FIG. 1 is an isometric view of the gas turbine engine turbofan.

Referring to FIG. 1 the turbofan aircraft gas turbine engine 10 has a plurality of rotating fan blades 12 at the forward end. A case 14 of about 2.4 meters diameter, surrounds these blades being supported by struts 16. The case has an isogrid structure 20 with aluminum sheet metal plate 18 bonded thereto, surrounded by multiple wraps of ballistic woven fabric 22 such as KEVLAR fabric. It also contains on a radially inside surface a wear strip 24 and a sound deadening honeycomb 26.

Figure 2:
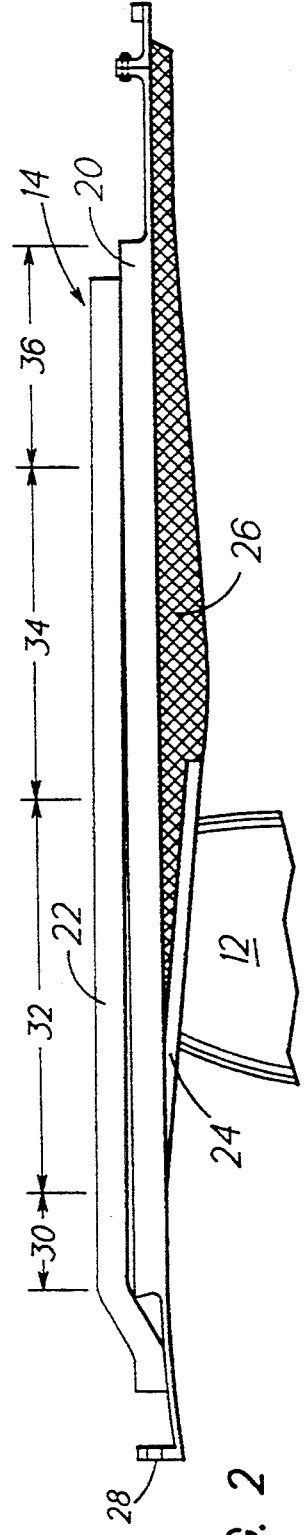
FIG. 2 is a section through the casing showing the relationship to the fan blade.

The case has a flange at the forward end for securing an inlet airflow cowl (not shown). FIG. 2 is a section through casing 14 showing it's relationship to blade 12.

At the forward end of the case there is a forward containment zone 30 which is upstream of the blade 12. It is recommended that this zone extend to at least 15° in front of the stacking line of the blade as measured from the axis of the rotation.

Downstream of the forward containment zone is the inplane containment zone 32. This extends well into the zone of the blade 12, but need not extend all the way to the rear end of the blade.

An aft containment zone 34 follows this and ultimately the support zone 36.

Figure 3:
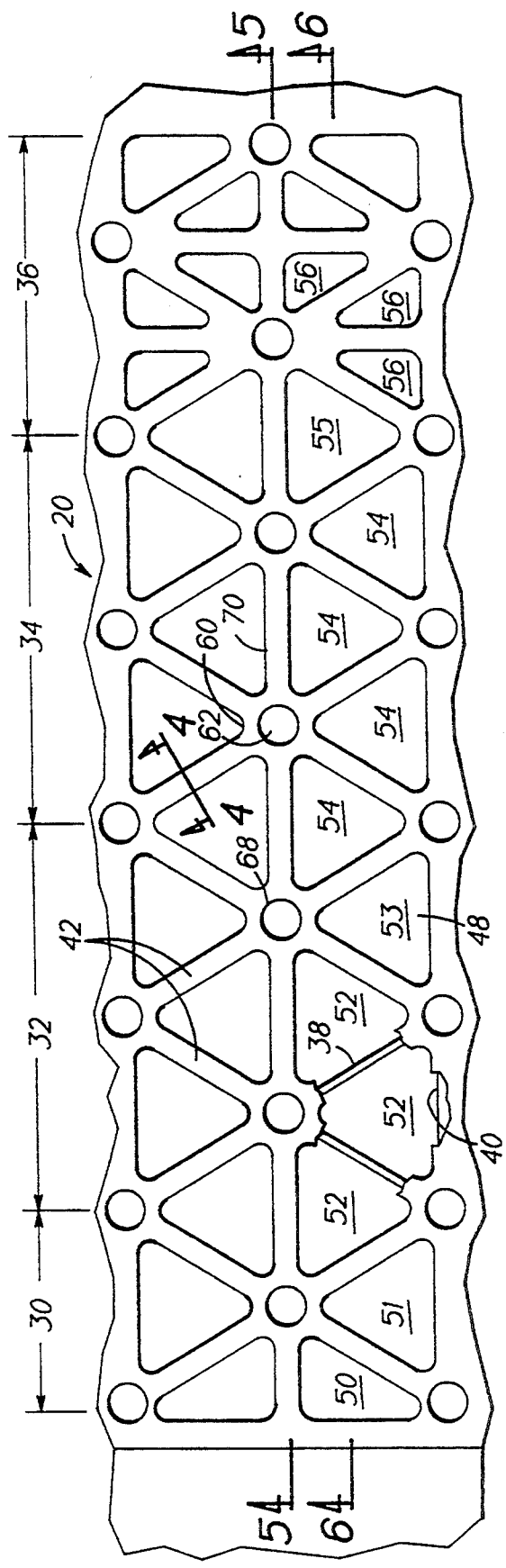
FIG. 3 is a view of the isogrid.

FIG. 3 is a view of the isogrid showing these same zones. The isogrid is formed of a plurality of ribs 38 in isometric triangular form. These ribs in the containment zones run either parallel to the axis of the case as does rib 40 or at 60° with respect to the axis as do ribs 42. Circumferentially running ribs perpendicular to the axis of the case are avoided to the forward containment zone, the inplane containment zone, and the aft containment zone where penetration of the casing by blade fragments can be expected. It has been found that on penetration of the easing a fracture can follow a circumferential rib leading to complete failure to the casing.

Figure 4:
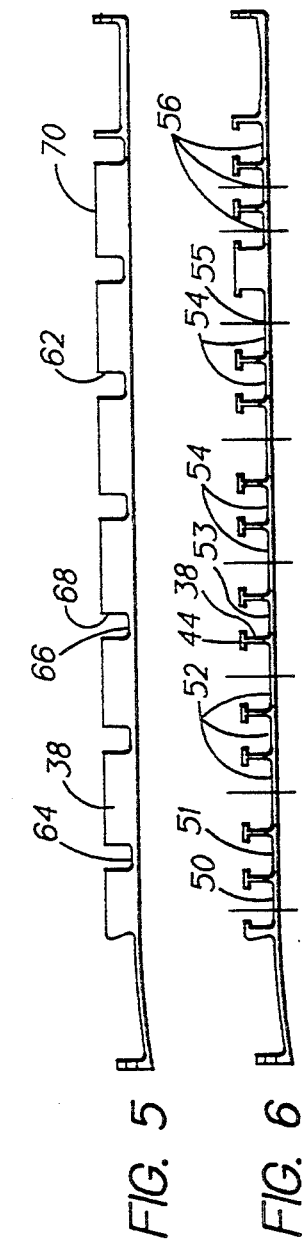
FIG. 4 is section 4—4 of FIG. 3 showing the rib.

As best seen in FIG. 4, each rib is flanged with flange 44 located at the radially outside edge of the isogrid. An inside skin 46 is integral with the rib structure.

Returning to FIG. 3 a plurality of skin segments 48 are formed by the ribs. The thickness of the various skin segments varies in order to save weight while still providing adequate containment of liberated fragments, minimizing the size of the hole created by the released blade and minimizing casing cracking under impact and imbalanced loads. Also of concern is adequate stiffness to prevent case buckling under the wrapped fabric load, the retention load and blade fragment rebound load. There must also be adequate case stiffness for resonance margin and to avoid buckling because of the cantilevered load from support struts 16. The structure must also provide a bearing surface for the unbalanced fan rotor which will be experienced after a fan blade is lost.

The engine must be able to coast to a stop without disintegration of the case.

The forward skin segment 50 is 3.81 millimeters thick with skin casing 51 being 4.83 millimeters thick. As we approach the fan containment zone, skin casing segments 52 are 5.72 millimeters thick. As we progress toward the aft end of the casing segment 53 is 4.83 millimeters thick and segments 54 are 3.81 millimeters thick. Finally segments 55 and 56 are 2.92 and 2.03 millimeters thick respectively.

Adjacent skin segments across ribs do not differ from the adjacent segment by more than 30% in the containment zones subject to blade penetration, these being the forward containment zone, the inplane containment zone and the aft containment zone. In the rear support zone adjacent thickness does not vary more than 50%. It has been found that excessive thickness differences across the rib has caused the openings formed by the penetrating blade to follow crack lines and be larger than desirable.

Each node 60 where the apex of the triangles join is machined out with a pocket 62 but leaving a residual skin 64. The skin thickness at these pockets is preferably the same as the skin thickness of the segments along side in the circumferential direction. For instance the skin 66 of pocket 68 is 4.83 millimeters, the same as the thickness of skin segment 53.

Figure 5:
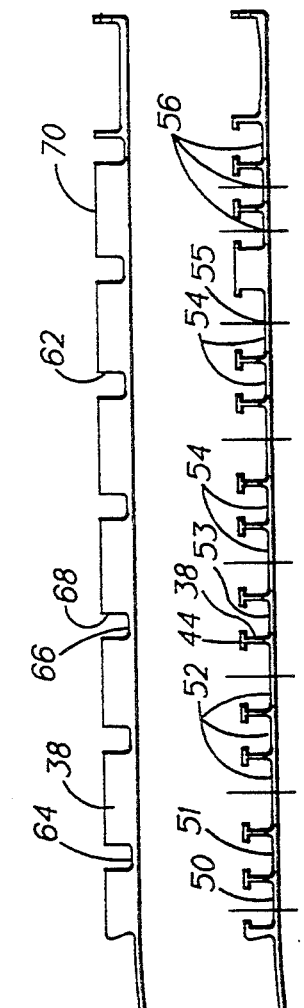
FIG. 5 is section 5—5 of FIG. 3 through an axially running rib.

FIG. 5 shows the axially extending ribs 70 along with the plurality of pockets 62.

Figure 6:
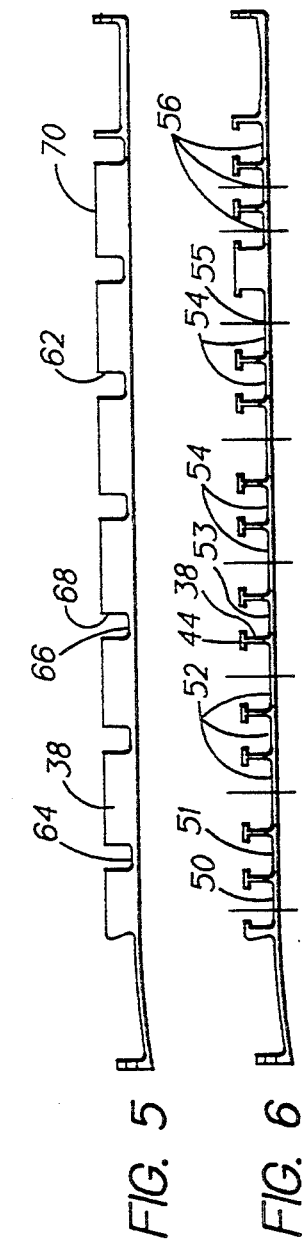
FIG. 6 is section 6—6 of FIG. 3 between axially running ribs.

In FIG. 6 a section is taken between the axially extending ribs and accordingly ribs 38 and flanges 44 can be seen. The varying thickness of the skin is shown as using the same reference numerals as in FIG. 3.

The various thickness in each zone together with the ballistic fabric contains liberated blade fragments while minimizing the size of the hole created by the released blade. Case cracking is minimized under impact and imbalance loads. Sufficient case stiffness exists to prevent buckling and provide resonance margin. A bearing surface is provided to restrain rotor whirl for the fan rotor during imbalance.

We claim:

1. An aircraft fan containment system for a turbofan engine having a rotating plurality of fan blades comprising:
    a cylindrical case surrounding said plurality of fan blades;
    said cylindrical case having a forward containment zone upstream of said fan blades, an inplane containment zone downstream of said forward containment zone, an aft containment zone downstream of said inplane containment zone, and a rear support zone downstream of said aft containment zone;
    a multiple layer winding of ballistic fabric surrounding said case;
    said case formed of an isogrid having a lattice of flanged ribs in isometric triangular relationship, with a flange on the outside edge of each rib, said ribs running parallel to the axis of the case and 60° from said axis;
    a skin on the inside edge of said isogrid whereby triangular skin segments are formed between said ribs; and
    said skin segments having a maximum thickness in said inplane containment zone, and a lesser thickness in said forward containment zone and said aft containment zone.

2. A containment system as in claim 1, further comprising:
    the thickness of said skin in adjacent skin segments not differing more than 30%.

3. A containment system as in claim 2, further comprising:
    said forward containment zone having a plurality of skin segments of differing thickness.

4. A containment zone as in claim 3, further comprising:
    said aft containment zone having a plurality of skin segments of differing thickness.

5. An aircraft containment system as in claim 1, further comprising:
    skin segments of said rear support zone having a thickness less than the skin segments of said aft containment zone.

6. A containment system as in claim 1, further comprising:
    a node formed at an apex of joining triangles having a thickness equal to the depth of the adjoining ribs;
    a pocket machined into each node leaving a residual skin; and a thickness of said residual skin being the same as the skin thickness of skin segments alongside said pocket in the circumferential direction.

7. A containment system as in claim 2, further comprising:
    a node formed at an apex of joining triangles having a thickness equal to the depth of the adjoining ribs;
    a pocket machined into each node leaving a residual skin; and
    a thickness of said residual skin being the same as the skin thickness of skin segments alongside said pocket in the circumferential direction.

8. A containment system as in claim 3, further comprising:
    a node formed at an apex of joining triangles having a thickness equal to the depth of the adjoining ribs;
    a pocket machined into each node leaving a residual skin; and
    a thickness of said residual skin being the same as the skin thickness of skin segments alongside said pocket in the circumferential direction.

9. A containment system as in claim 5, further comprising:
    a node formed at an apex of joining triangles having a thickness equal to the depth of the adjoining ribs;
    a pocket machined into each node leaving a residual skin; and
    a thickness of said residual skin being the same as the skin thickness of skin segments alongside said pocket in the circumferential direction.

* * * * *